US010063717B2

United States Patent
Iwamoto et al.

(10) Patent No.: US 10,063,717 B2
(45) Date of Patent: Aug. 28, 2018

(54) INFORMATION TRANSMITTING DEVICE, INFORMATION TRANSMITTING METHOD, AND INFORMATION TRANSMITTING PROGRAM

(71) Applicant: Konica Minolta, Inc., Tokyo (JP)

(72) Inventors: Shohei Iwamoto, Hyogo (JP); Yoshiyuki Harada, Tokyo (JP)

(73) Assignee: Konica Minolta, Inc., Tokyo (JP)

(*) Notice: Subject to any disclaimer, the term of this patent is extended or adjusted under 35 U.S.C. 154(b) by 0 days.

(21) Appl. No.: 14/979,078

(22) Filed: Dec. 22, 2015

(65) Prior Publication Data

US 2016/0188262 A1 Jun. 30, 2016

(30) Foreign Application Priority Data

Dec. 29, 2014 (JP) .................................. 2014-266992

(51) Int. Cl.
G06F 3/12 (2006.01)
G06F 3/00 (2006.01)
H04N 1/00 (2006.01)
H04L 29/08 (2006.01)
G06K 15/00 (2006.01)

(52) U.S. Cl.
CPC ......... *H04N 1/00204* (2013.01); *H04L 67/34* (2013.01)

(58) Field of Classification Search
CPC ........... H04N 1/00209; H04N 1/32128; H04N 2201/0094; H04N 1/32096;
(Continued)

(56) References Cited

U.S. PATENT DOCUMENTS

2007/0165268 A1* 7/2007 Sodeura ............. H04N 1/00209
358/1.15
2010/0218125 A1* 8/2010 Seki ................... H04N 1/00204
715/762

(Continued)

FOREIGN PATENT DOCUMENTS

JP 2007-194710 A 8/2007
JP 2008-022183 A 1/2008
(Continued)

*Primary Examiner* — Chad Dickerson
(74) *Attorney, Agent, or Firm* — Osha Liang LLP (57) ABSTRACT

An information transmitting device includes: a receiving unit configured to receive setting of a first mode or a second mode as a transmitting mode; a transmitting unit configured to transmit the data in the transmitting mode the setting of which is received; a first obtaining unit configured to obtain identification information associated with a process by an application for setting; a storage unit configured to store the obtained identification information; a second obtaining unit configured to obtain the identification information regarding the transmitting process of the data when the first mode is set; a determining unit configured to determine whether the identification information stored in the storage unit is identical to the identification information obtained by the second obtaining unit; and a switching unit configured to switch the transmitting mode to the second mode when it is determined that the pieces of identification information are not identical to each other.

12 Claims, 10 Drawing Sheets (58) Field of Classification Search
CPC ........... H04N 1/00822; H04N 1/00384; H04N 1/00389; H04N 1/00411; H04N 1/00681; H04N 1/00204; G06F 3/1204; G06F 3/1285; G06F 3/1205; G06F 3/1225; G06F 3/1288; G06F 3/1297; H04L 67/34
USPC ....... 358/1.11–1.18, 1.9, 448, 474, 401–406; 715/762, 778, 700
See application file for complete search history.

(56) References Cited

U.S. PATENT DOCUMENTS

| 2012/0147436 | A1* | 6/2012 | Nishiyama | H04N 1/32096 358/406 |
|---|---|---|---|---|
| 2013/0194601 | A1* | 8/2013 | Nakagawa | G06F 3/1205 358/1.13 |
| 2013/0201529 | A1* | 8/2013 | Morita | H04N 1/00408 358/402 |
| 2013/0250331 | A1* | 9/2013 | Kobayashi | G06F 3/1205 358/1.13 |
| 2013/0329250 | A1* | 12/2013 | Takamiya | H04N 1/00389 358/1.15 |
| 2015/0281495 | A1* | 10/2015 | Kamoi | H04N 1/00822 358/474 |

FOREIGN PATENT DOCUMENTS

| JP | 2010-288102 A | | 12/2010 |
|---|---|---|---|
| JP | 2010288102 A | * | 12/2010 |
| JP | 2011-119880 A | | 6/2011 |
| JP | 2011119880 A | * | 6/2011 |

* cited by examiner

INFORMATION TRANSMITTING DEVICE, INFORMATION TRANSMITTING METHOD, AND INFORMATION TRANSMITTING PROGRAM

The entire disclosure of Japanese Patent Application No. 2014-266992 filed on Dec. 29, 2014 including description, claims, drawings, and abstract are incorporated herein by reference in its entirety.

FIELD OF THE INVENTION

This disclosure relates to an information transmitting device, an information transmitting method, and an information transmitting program, and especially relates to the information transmitting device, information transmitting method, and information transmitting program configured to transmit information by using a transmitting unit such as a facsimile.

BACKGROUND

There is a case in which an information processing device such as a PC (personal computer) has a facsimile transmitting function and a mail transmitting function, or a case in which this may communicate with a device having the facsimile transmitting function and the mail transmitting function. In such a case, the information processing device may receive specification of a file to be transmitted from a user and transmit the specified file to another device by using the function. In this case, the information processing device serves as the information transmitting device.

When the above-described transmitting function is used in the information processing device, an application for transmitting required for using the function such as a facsimile driver is installed in advance in the information processing device. The user of the information processing device starts the application for transmitting and configures necessary transmission setting on a screen thereof to issue an instruction to transmit.

The transmission setting includes setting of a destination. The user sets the destination by performing operation to input the destination or select the same from a plurality of candidates for the destination registered in advance on the above-described screen. At that time, when the user erroneously inputs or selects, the information is erroneously transmitted. For this, JP 2010-288102 A (Patent Literature 1), JP 2007-194710 A (Patent Literature 2), JP 2011-119880 A (Patent Literature 3), JP 2008-22183 A (Patent Literature 4) and the like, for example, disclose various technologies for preventing the erroneous transmission.

As a function to easily configure the transmission setting, a program for intermediation for the application using a command and a function referred to as an API (application programming interface) used in the application for transmitting is provided. In the following description, the program for intermediation is also referred to as a "setting application".

The setting application is the application designed according to the user. Therefore, it is possible to register the transmission setting by the user such as the destination and a transmission amount (the number of copies to be transmitted) in advance in the setting application. When the user issues an instruction to execute, the setting application passes the transmission setting to the application for transmitting. Alternatively, the setting application passes the transmission setting to the application for transmitting through an application for preparing information such as a document preparation application.

The above-described setting application also passes a command not to display a screen (UI: user interface) for inputting the transmission setting to the application when passing the transmission setting to the application for transmitting. In the following description, a state in which the application transmits the information according to the passed transmission setting without displaying the user interface according to the above-described command is also referred to as a UI less mode.

The application for transmitting to which the transmission setting is passed executes a process of transmitting the specified file based on the passed transmission setting without displaying the user interface for inputting the transmission setting on the information processing device. When the transmission is completed, this notifies the setting application of transmission completion.

The setting application which is notified of the transmission completion passes a command to return the UI less mode to a normal mode in which the user interface is displayed to receive the input of the transmission setting (also referred to as normal mode) to the application for transmitting. According to this, the application for transmitting performs normal operation to display the user interface to receive the input of the transmission setting from next start-up.

The user does not have to input the setting at each transmission by using the above-described setting application. That is to say, the user may issue an instruction to transmit the file with the transmission setting registered in the setting application in advance only by issuing an instruction to execute the setting application.

There is a case in which trouble occurs in the setting application in operation and the application terminates. If a termination timing is after the setting application passes the command to set the mode to the UI less mode to the application for transmitting and before this passes the command to return the mode to the normal mode, the UI less mode is maintained even after the file is transmitted in the application for transmitting.

In this state, when the user of the information processing device specifies a (next) file to be transmitted and instructs the application for transmitting to transmit the same, the application for transmitting might execute the transmitting process of the next specified file with the transmission setting passed from the setting application in the UI less mode unchanged. That is to say, the application for transmitting might transmit the next file with the transmission setting the same as that when a previous file is transmitted in the UI less mode unchanged when this should operate in the normal mode to execute the transmitting process of the next file even though the transmission of the (previous) file based on the transmission setting passed from previous setting application is completed. Therefore, there is a case in which the next file is transmitted with the transmission setting different from that intended by the user as the transmission setting of the next file.

SUMMARY OF THE INVENTION

In one aspect, one or more embodiments of the invention may provide an information transmitting device, an information transmitting method, and an information transmitting program capable of effectively avoiding a transmission of an information with a transmission setting which is not intended by the user.

An information transmitting device in accordance with one or more embodiments of the invention comprises: a receiving unit configured to receive setting of a first mode in which data is transmitted based on transmission setting received from an application for setting or a second mode in which the data is transmitted based on the transmission setting received by input from a user on a setting screen as a transmitting mode; a transmitting unit configured to transmit the data in the transmitting mode the setting of which is received; a first obtaining unit configured to obtain identification information associated with a process by the application for setting for each transmitting process of the data by the transmitting unit; a storage unit configured to store the obtained identification information; a second obtaining unit configured to obtain the identification information regarding the transmitting process of the data to be transmitted before the transmitting unit transmits the data when the first mode is set; a determining unit configured to determine whether the identification information stored in the storage unit is identical to the identification information obtained by the second obtaining unit; and a switching unit configured to switch the transmitting mode to the second mode when it is determined that the pieces of identification information are not identical to each other.

The identification information is associated with the process by the application for setting after the first mode is set until the mode is switched to the second mode.

The identification information is updated each time the process by the application for setting is completed.

The receiving unit receives setting to switch from the first mode to the second mode when the transmitting process of the data by the transmitting unit in a state in which the first mode is set is completed.

The first obtaining unit obtains the identification information when the setting of the first mode is received by the receiving unit.

An information transmitting method of an information transmitting device provided with a transmitting unit which transmits data in a set transmitting mode, the information transmitting method in accordance with one or more embodiments of the invention comprises: a receiving step of receiving setting of a first mode in which the data is transmitted based on transmission setting received from an application for setting or a second mode in which the data is transmitted based on the transmission setting received by input from a user on a setting screen as the transmitting mode; a first obtaining step of obtaining identification information associated with a process by the application for setting for each transmitting process of the data by the transmitting unit; a storing step of storing the obtained identification information in a storage unit; a second obtaining step of obtaining the identification information regarding the transmitting process of the data to be transmitted before the transmitting unit transmits the data when the first mode is set; a determining step of determining whether the identification information stored in the storage unit is identical to the identification information obtained at the second obtaining step; and a switching step of switching the transmitting mode to the second mode when it is determined that the pieces of identification information are not identical to each other.

The identification information is associated with the process by the application for setting after the first mode is set until the mode is switched to the second mode.

The identification information is updated each time the process by the application for setting is completed.

The receiving step receives setting to switch from the first mode to the second mode when the transmitting process of the data by the transmitting unit in a state in which the first mode is set is completed.

The first obtaining step obtains the identification information when the setting of the first mode is received at the receiving step.

A non-transitory recording medium storing a computer readable information transmitting program an information transmitting process of which is executed by a computer of an information transmitting device provided with a transmitting unit which transmits data in a set transmitting mode, the information transmitting program in accordance with one or more embodiments of the invention allows the computer to execute: a receiving step of receiving setting of a first mode in which the data is transmitted based on transmission setting received from an application for setting or a second mode in which the data is transmitted based on the transmission setting received by input from a user on a setting screen as the transmitting mode; a first obtaining step of obtaining identification information associated with a process by the application for setting for each transmitting process of the data by the transmitting unit; a storing step of storing the obtained identification information in a storage unit; a second obtaining step of obtaining the identification information regarding the transmitting process of the data to be transmitted before the transmitting unit transmits the data when the first mode is set; a determining step of determining whether the identification information stored in the storage unit is identical to the identification information obtained at the second obtaining step; and a switching step of switching the transmitting mode to the second mode when it is determined that the pieces of identification information are not identical to each other.

The identification information is associated with the process by the application for setting after the first mode is set until the mode is switched to the second mode.

The identification information is updated each time the process by the application for setting is completed.

The receiving step receives setting to switch from the first mode to the second mode when the transmitting process of the data by the transmitting unit in a state in which the first mode is set is completed.

The first obtaining step obtains the identification information when the setting of the first mode is received at the receiving step.

BRIEF DESCRIPTION OF THE DRAWINGS

Advantages and features of one or more embodiments will become more fully understood from the detailed description given hereinbelow and the appended drawings which are given by way of illustration only, and thus are not intended as a definition of the limits of the embodiments of the invention, and wherein.

DETAILED DESCRIPTION

Hereinafter, embodiments of the invention will be described with reference to the drawings. However, the scope of the invention is not limited to the illustrated examples. The same reference sign is assigned to the same parts and components in the following description. The name and function thereof are also the same. Therefore, the description thereof is not repeated.

<System Configuration>

Figure 1:
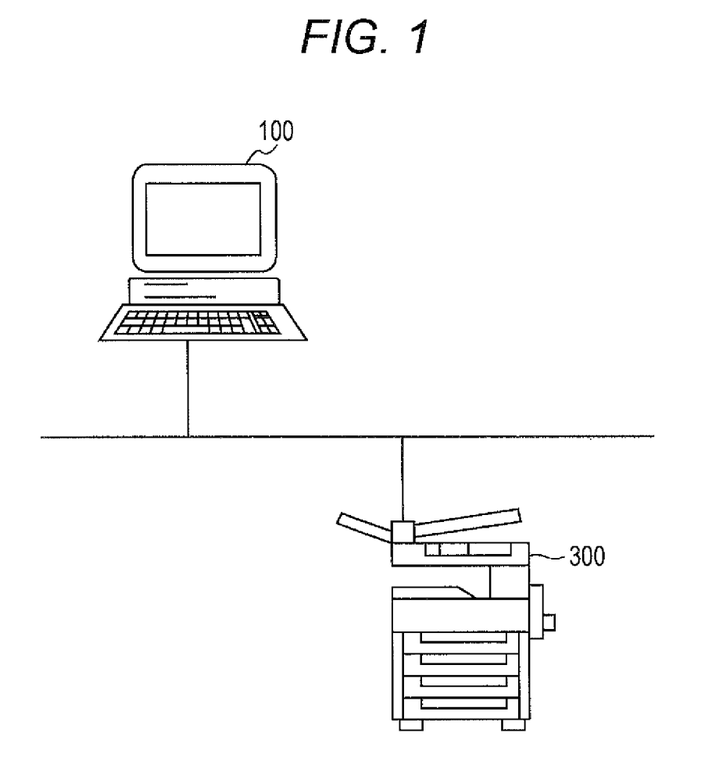
FIG. 1 is a view illustrating an example of a configuration of a system according to an embodiment.

FIG. 1 is a view illustrating an example of a configuration of a system in accordance with embodiments of the invention. With reference to FIG. 1, this system includes a PC (personal computer) 100 as an example of an information processing device and an MFP (multi-functional peripheral) 300 as an example of a device having an information transmitting function. The PC 100 and the MFP 300 connected to a wired or wireless network may communicate with each other.

The MFP 300 has a facsimile transmitting function and a mail transmitting function as the information transmitting function. The device having the information transmitting function is not limited to the MFP 300. The PC 100 itself may have the information transmitting function.

<Device Configuration>

Figure 2:
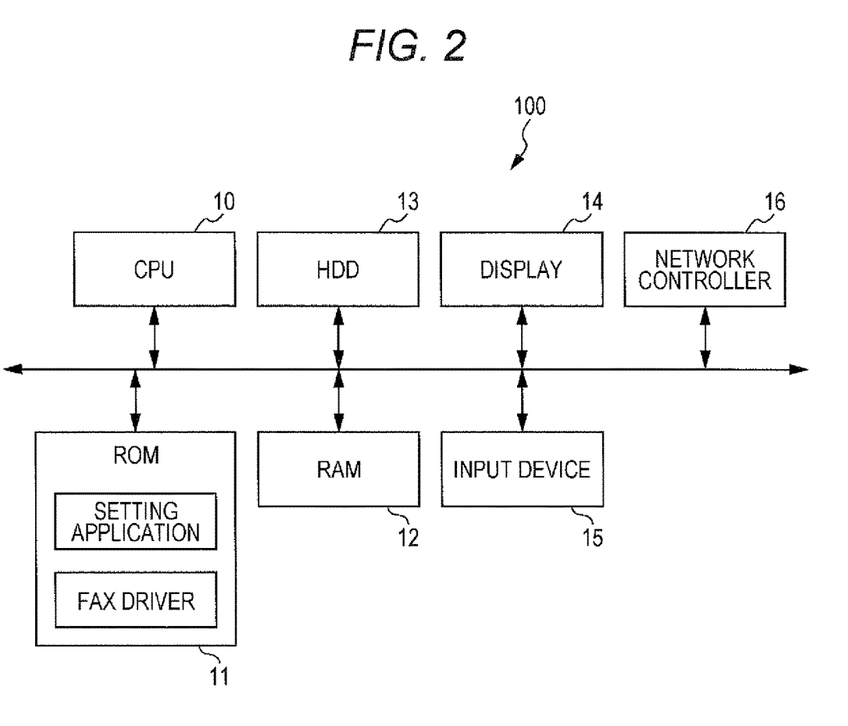
FIG. 2 is a block diagram illustrating an example of a device configuration of a PC (personal computer) included in the system.

FIG. 2 is a block diagram illustrating an example of a device configuration of the PC 100. The PC 100 may be a general computer. That is to say, with reference to FIG. 2, the PC 100 includes a CPU (central processing unit) 10 for controlling an entire device, a ROM (read only memory) 11 for storing a program executed by the CPU 10, a RAM (random access memory) 12 serving as a working area when the CPU 10 executes the program, and a HDD (hard disk drive) 13 for storing image data and the like.

The PC 100 also includes a display 14 and an input device 15. The input device 15 is a keyboard, a mouse and the like. The PC 100 further includes a network controller 16 for controlling the communication with the MFP 300.

Setting application and a fax driver are stored (installed) in the ROM 11 as the program executed by the CPU 10. The fax driver is software for controlling the facsimile transmitting function of the MFP 300.

The fax driver receives information for specifying a file to be transmitted and transmission setting such as a destination and the number of copies to be transmitted from the CPU 10 and issues a transmission instruction to the facsimile transmitting function of the MFP 300. As an example of operation, when the fax driver is instructed by a user to be started, this displays a setting screen for inputting the transmission setting such as the destination and the number of copies to be transmitted to receive setting input from the user. Then, the fax driver instructs the MFP 300 to transmit the specified filed with the received transmission setting.

It may be said that the setting application is an application for setting for configuring the transmission setting for the fax driver, the application for assisting the transmission setting for the fax driver by user operation. The transmission setting such as the destination passed to the facsimile transmitting function of the MFP 300 is registered in advance in the setting application. The setting application automatically passes the transmission setting to the fax driver when instructed by the user to be started. Therefore, the setting application may allow the fax driver to issue the transmission instruction to the MFP 300 without the need of the user operation on the setting screen when the fax driver is started.

The fax driver has two modes as operation modes for operation to instruct the MFP 300 to transmit the file to be transmitted; a first mode and a second mode. The first mode is the mode in which the fax driver receives the transmission setting from the setting application and instructs the MFP 300 to transmit the file with the received transmission setting without displaying the setting screen to receive the setting input from the user. In the following description, the first mode is also referred to as a UI (user interface) less mode. The second mode is the mode in which the fax driver displays the setting screen to receive the setting input from the user and instructs the MFP 300 to transmit the file with the received transmission setting. In the following description, the second mode is also referred to as a normal mode.

Figure 3:
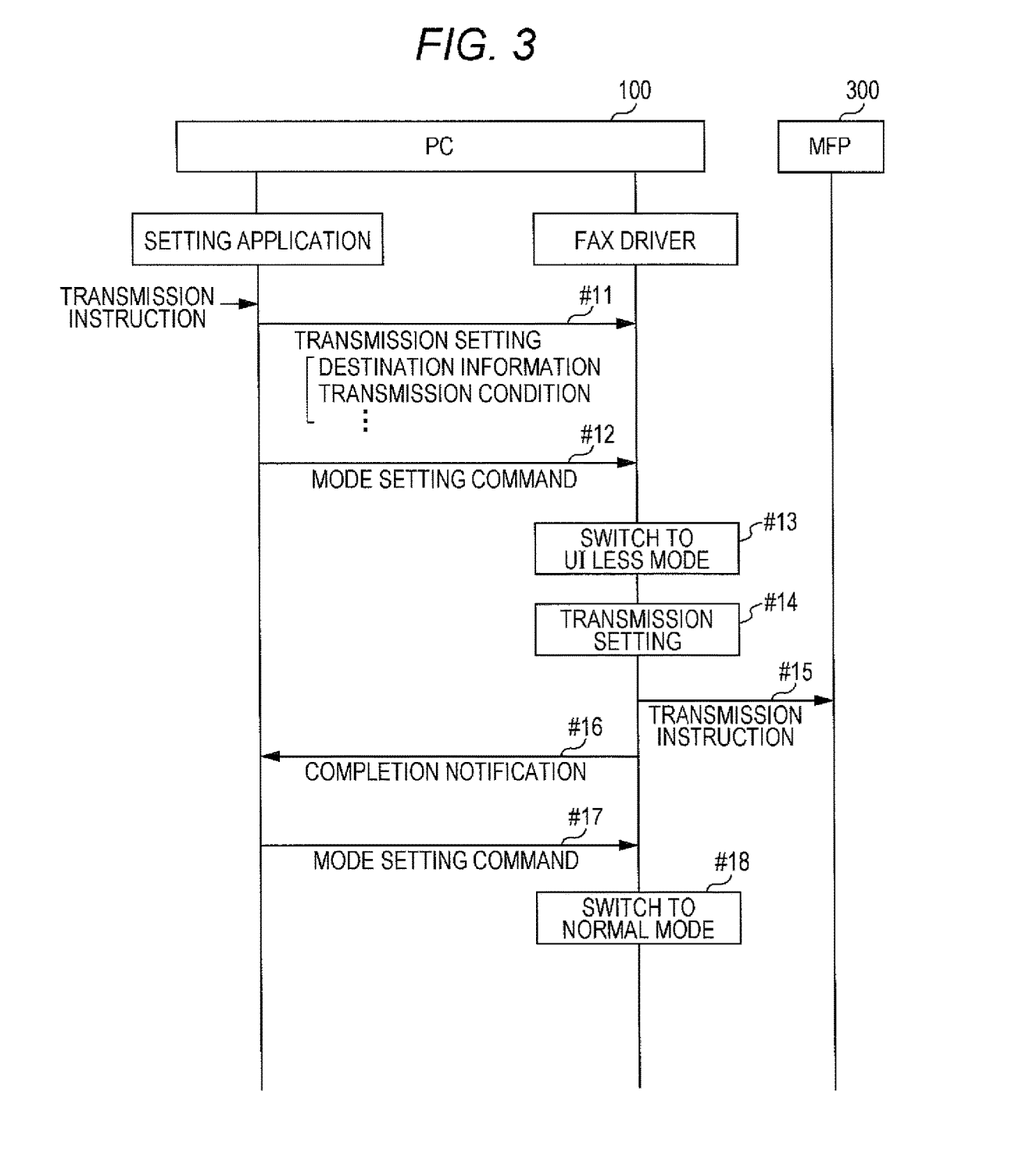
FIG. 3 is a view for illustrating an operation.
Figure 4:
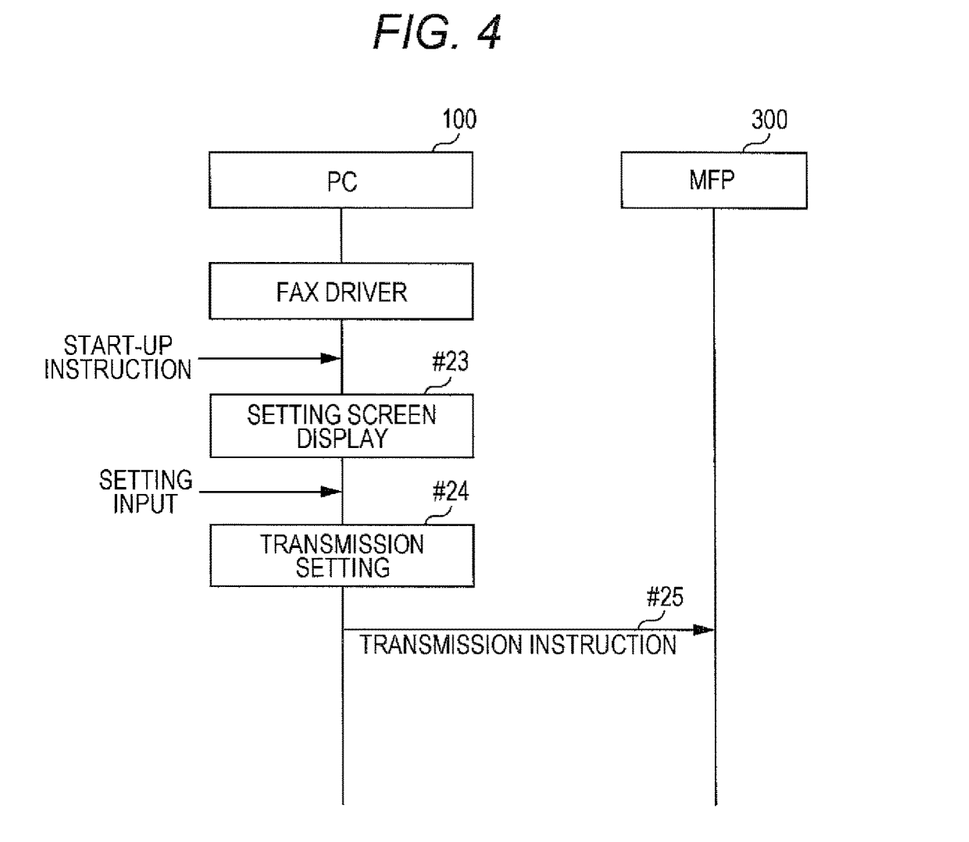
FIG. 4 is a view for illustrating an operation.
Figure 5:
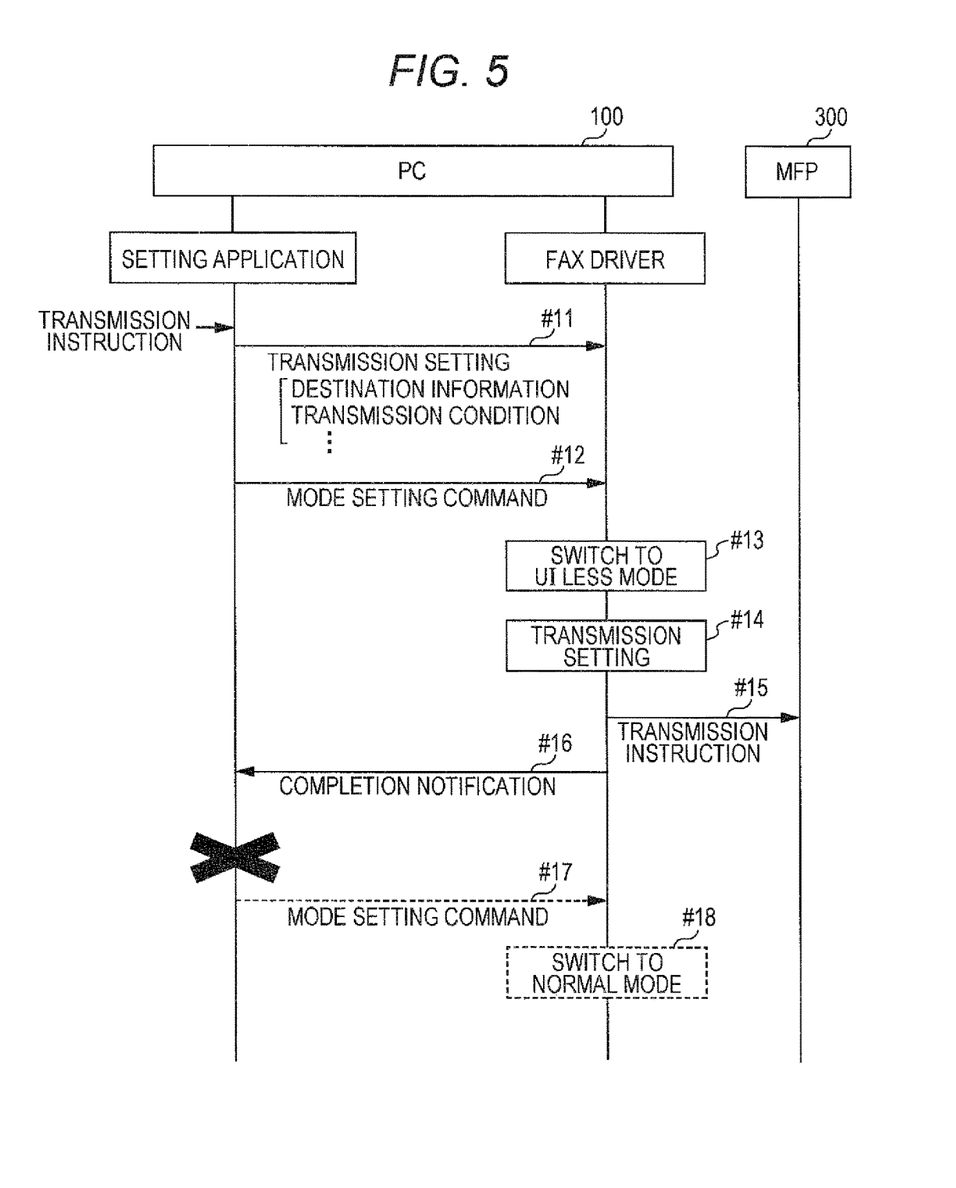
FIG. 5 is a view for illustrating an operation.

FIGS. 3 to 5 are views for illustrating an operation of the fax driver and the setting application. Specifically, FIG. 3 illustrates a flow of operation of the system when the MFP 300 is instructed to transmit using the setting application.

The setting application, an icon and the like of which is prepared on a screen of the PC 100, waits for the instruction from the user. With reference to FIG. 3, when receiving the instruction to operate from the user, the CPU 10 starts the setting application.

The CPU 10 which starts the setting application passes the transmission setting such as destination information and the number of copies to be transmitted registered in the setting application in advance to the fax driver (step #11). The CPU 10 which executes the setting application transmits a command to set the mode to the UI less mode to the fax driver (step #12).

When the CPU 10 which executes the setting application transmits the above-described command and transmission setting to the fax driver, this starts the fax driver. The CPU 10 starts the fax driver while setting the operation mode to the normal mode being the operation mode when the fax driver is most recently terminated stored in the fax driver.

The CPU 10 which starts the fax driver switches the operation mode of the fax driver from the normal mode to the UI less mode according to the command (step #13). The CPU 10 which starts the fax driver sets the transmission setting passed from the setting application as the transmission setting of the specified file (step #14) and instructs the MFP 300 to transmit the file (step #15).

Thereafter, the CPU 10 notifies the setting application of transmission completion (step #16). In response to this notification, the CPU 10 which executes the setting application transmits a command to set the mode to the normal mode to the fax driver (step #17). The CPU 10 which executes the fax driver switches the operation mode of the fax driver from the UI less mode to the normal mode according to the command (step #18).

Since the above-described operation is performed by the PC 100, the fax driver enters the UI less mode when the user issues an instruction to transmit by using the setting application and the PC 100 instructs the MFP 300 to transmit the specified file with the transmission setting registered in advance without displaying the setting screen to receive the input of the transmission setting of the user. When the transmission instruction to the MFP 300 is completed, the PC 100 returns the operation mode of the fax driver from the UI less mode to the normal mode. According to this, when the user starts the fax driver next time, this is started in the normal mode.

FIG. 4 illustrates a flow of operation of the system when the MFP 300 is instructed to transmit using only the fax driver without using the setting application. The CPU 10 automatically starts the fax driver when receiving the instruction to transmit a facsimile in a document preparation application and the like. It is also possible that an icon for issuing an instruction to start the fax driver is prepared on the screen of the PC 100 as in the case of the setting application.

With reference to FIG. 4, when the CPU 10 is instructed by the user operation to start the fax driver by receiving the instruction to transmit a facsimile in the document preparation application and the like and by receiving the user instruction through the above-described icon, this starts the fax driver.

The CPU 10 which starts the fax driver displays the setting screen (step #23) and receives the input of the transmission setting by the user operation on the setting screen. The CPU 10 which executes the fax driver sets the transmission setting received on the setting screen as the transmission setting of the specified file (step #24) and instructs the MFP 300 to transmit the file (step #25).

Since the PC 100 performs the above-described operation, the fax driver starts in the normal mode when the user issues the instruction to start the fax driver. Therefore, the screen for the transmission setting is displayed. According to this, the user may instruct the fax driver of the transmission setting.

In order to start the fax driver in the normal mode when the user issues the instruction to start the same as illustrated in FIG. 4, it is necessary that the CPU 10 which executes the fax driver operates in the UI less mode by the command from the setting application and thereafter returns the mode to the normal mode according to the command from the setting application as illustrated in FIG. 3. However, in the event of failure while the CPU 10 operates the setting application, the CPU 10 might terminate execution of the setting application as illustrated in FIG. 5. That is to say, with reference to FIG. 5, suppose that the CPU 10 passes the transmission setting to the fax driver (step #11) and transmits the command to sett the mode to the UI less mode (step #12), and thereafter terminates the execution of the setting application due to failure as an example. In this case, the transmission of the command to set the mode to the normal mode from the setting application to the fax driver at step #17 described above is not executed. Therefore, in this case, the operation mode of the fax driver is not switched to the normal mode and the UI less mode is maintained.

When the CPU 10 which executes the fax driver completes the transmission instruction to the MFP 300, this terminates the execution of the fax driver. The CPU 10 stores the operation mode when the execution of the fax driver is terminated and starts the same in this mode at the time of next start-up. As described above, when the UI less mode is maintained when the execution of the fax driver is terminated, the CPU 10 starts the fax driver next time in the UI less mode. In this case, even in a case of starting the fax driver next time not by the instruction from the setting application (FIG. 4), the CPU 10 starts the fax driver in the UI less mode, so that the setting screen is not displayed and the MFP 300 is automatically instructed to transmit with the transmission setting previously passed from the setting application. Therefore, even when the user starts the fax driver with the intention to perform the transmission setting, the transmission setting cannot be performed, and the MFP 300 is instructed to transmit the file with the transmission setting which is not intended by the user.

<Operation Outline>

Figure 6:
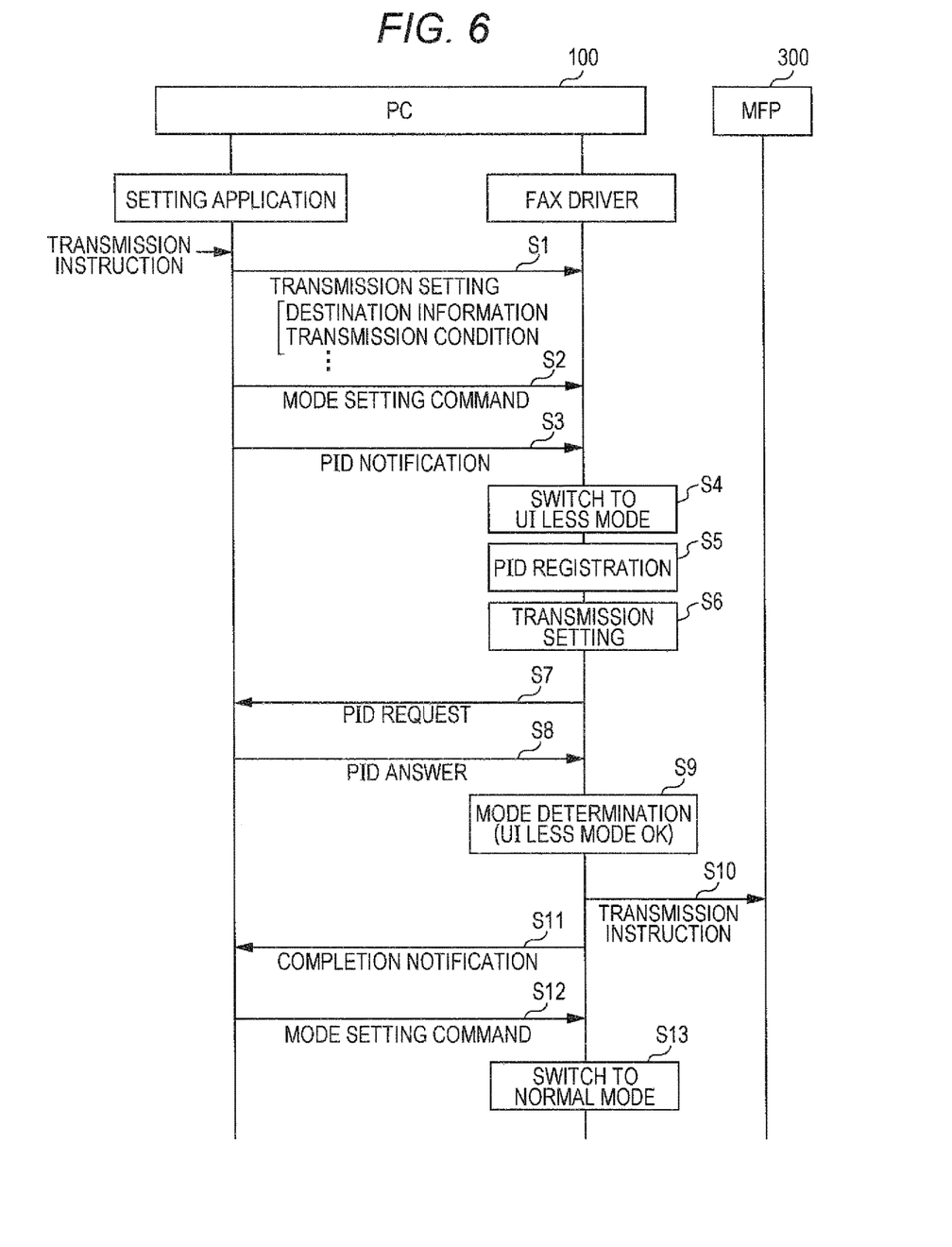
FIG. 6 is a view illustrating an operation outline of the system.
Figure 7:
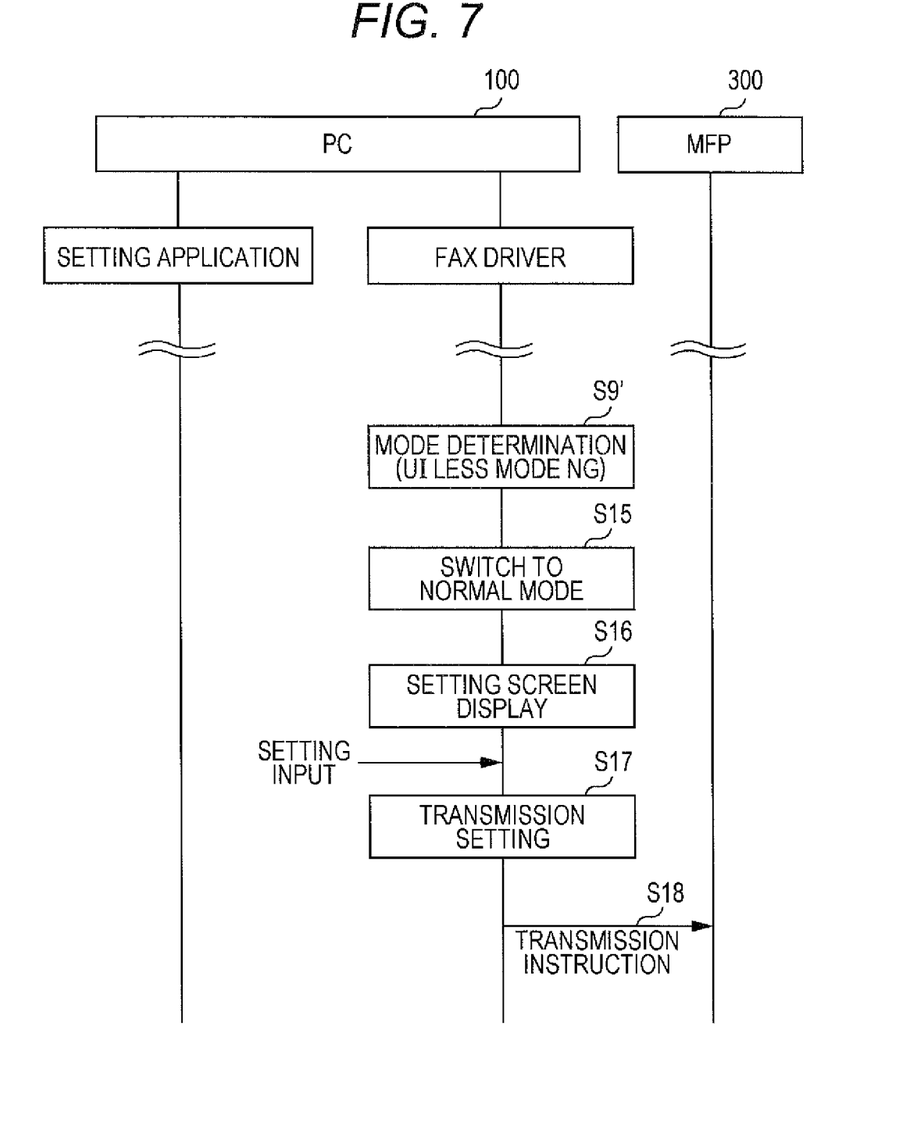
FIG. 7 is a view illustrating an operation outline of the system.

For the above-described operation, the system in accordance with embodiments of the invention operates as illustrated in FIGS. 6 and 7. FIGS. 6 and 7 are views illustrating an operation outline of this system.

With reference to FIG. 6, when receiving the instruction to operate from the user, the CPU 10 starts the setting application.

The CPU 10 which starts the setting application passes the transmission setting such as the destination information and the number of copies to be transmitted registered in the setting application in advance to the fax driver (step S1). The CPU 10 which executes the setting application transmits the command to set the mode to the UI less mode to the fax driver (step S2). Furthermore, the CPU 10 notifies the fax driver of identification information associated with a series of processes currently executed by executing the setting application (step S3). The above-described identification information is also referred to as a process identifier (PID) automatically assigned to each process in the PC 100. The above-described identification information is also referred to as PID in the following description.

When the CPU 10 which executes the setting application transmits the above-described command and transmission setting to the fax driver, this starts the fax driver.

The CPU 10 which starts the fax driver switches the operation mode of the fax driver from the normal mode to the UI less mode according to the command (step S4). The CPU 10 which starts the fax driver registers the PID notified from the fax driver in a memory such as the HDD 13 (step S5). The CPU 10 which starts the fax driver sets the transmission setting passed from the setting application as the transmission setting of the specified file (step S6).

The CPU 10 which executes the fax driver requests a current PID from the setting application before instructing the MFP 300 to transmit the file (step S7). Herein, the CPU 10 may also request the PID from all the applications currently executed by the CPU 10.

When receiving an answer of the PID from the setting application (step S8), the CPU 10 compares the same with the PID registered in the HDD 13 at step S5 described above to determine whether the current UI less mode is appropriate (step S9). That is to say, when the PID obtained from the setting application at step S8 described above is identical to the PID registered in the HDD 13, the CPU 10 determines that the current operation mode of the fax driver is "appropriately" the UI less mode. In a case in which the PID obtained from the setting application at step S8 described above is not identical to the PID registered in the HDD 13 or the PID registered in the HDD 13 is not included in the PIDs obtained from all the applications currently executed, the CPU 10 determines that the current operation mode of the fax driver is "inappropriately" the UI less mode.

When it is determined that the current operation mode of the fax driver is "appropriately" the UI less mode at step S9 described above, the CPU 10 which executes the fax driver instructs the MFP 300 to transmit the file with the transmission setting at step S6 described above (step S10).

Thereafter, the CPU 10 notifies the setting application of the transmission completion (step S11). In response to this notification, the CPU 10 which executes the setting application transmits the command to set the mode to the normal mode to the fax driver (step S12). The CPU 10 which executes the fax driver switches the operation mode of the fax driver from the UI less mode to the normal mode according to the command (step S13).

The CPU 10 which executes the fax driver may delete the PID of the setting application registered at step S5 described above from the HDD 13 when switching the mode to the normal mode at step S13 described above. When the PID of the setting application registered at step S5 described above is not deleted from the HDD 13, the CPU 10 which executes the fax driver overwrites the PID of the setting application most recently registered in the HDD 13 with the notified PID at step S5 described above. The CPU 10 which executes the setting application executes a series of processes after transmitting the command to set the mode to the UI less mode to the fax driver at step S2 described above until transmitting the command to return the mode to the normal mode at step S12 described above, so that the same PID is assigned to the processes. Therefore, the PID registered at step S5 described above is identical to the PID obtained at step S8 described above in both of the cases of writing the PID in the memory by the CPU 10 which executes the fax driver. That is to say, as illustrated in FIG. 6, to switch the operation mode to the UI less mode by the CPU 10 which executes the fax driver upon reception of the command to switch the mode to the UI less mode from the setting application is determined to be appropriate by the CPU 10 which executes the fax driver and the process is completed in this operation mode.

FIG. 7 illustrates the operation of this system when the current operation mode of the fax driver is determined to be "inappropriately" the UI less mode at step S9 described above. That is to say, with reference to FIG. 7, when the PID obtained from the setting application at step S8 described above is not identical to the PID registered in the HDD 13 and it is determined that the current operation mode of the fax driver is "inappropriately" the UI less mode (step S9'), the CPU 10 which executes the fax driver switches the operation mode of the fax driver from the UI less mode to the normal mode (step S15). The CPU 10 which executes the fax driver displays the setting screen (step S16) to receive the input of the transmission setting by the user operation on the setting screen. The CPU 10 sets the transmission setting received on the setting screen as the transmission setting of the specified file (step S17) and instructs the MFP 300 to transmit the file (step S18).

As illustrated in FIG. 5, when the setting application terminates without transmitting the command to return the mode to the normal mode at step S12 described above such as when the CPU 10 abnormally terminates the setting application, the UI less mode is stored in the fax driver as the operation mode. Therefore, when the CPU 10 starts the fax driver next time, this is started in the UI less mode. Furthermore, in this case, the PID notified from the setting application when the fax driver is previously started is kept registered in the HDD 13.

The CPU 10 which executes the fax driver requests the PID from the setting application before instructing the MFP 300 to transmit the file at step S10 described above when the operation mode is the UI less mode as illustrated in FIG. 6 (step S7). At that time, if the CPU 10 is executing the setting application, the CPU 10 which executes the fax driver obtains the PID from the setting application (step S8). However, when the fax driver is started not by the command from the setting application but by the user operation to instruct the fax driver to start, the PID obtained from the setting application at step S8 is different from the (previous) PID registered in the HDD 13.

In this case, as illustrated in FIG. 7, the CPU 10 which executes the fax driver switches the operation mode of the fax driver from the UI less mode to the normal mode. According to this, the instruction to the MFP 300 to transmit the specified file with the transmission setting using the previous setting application which is not intended by the user is avoided.

<Function Configuration>

Figure 8:
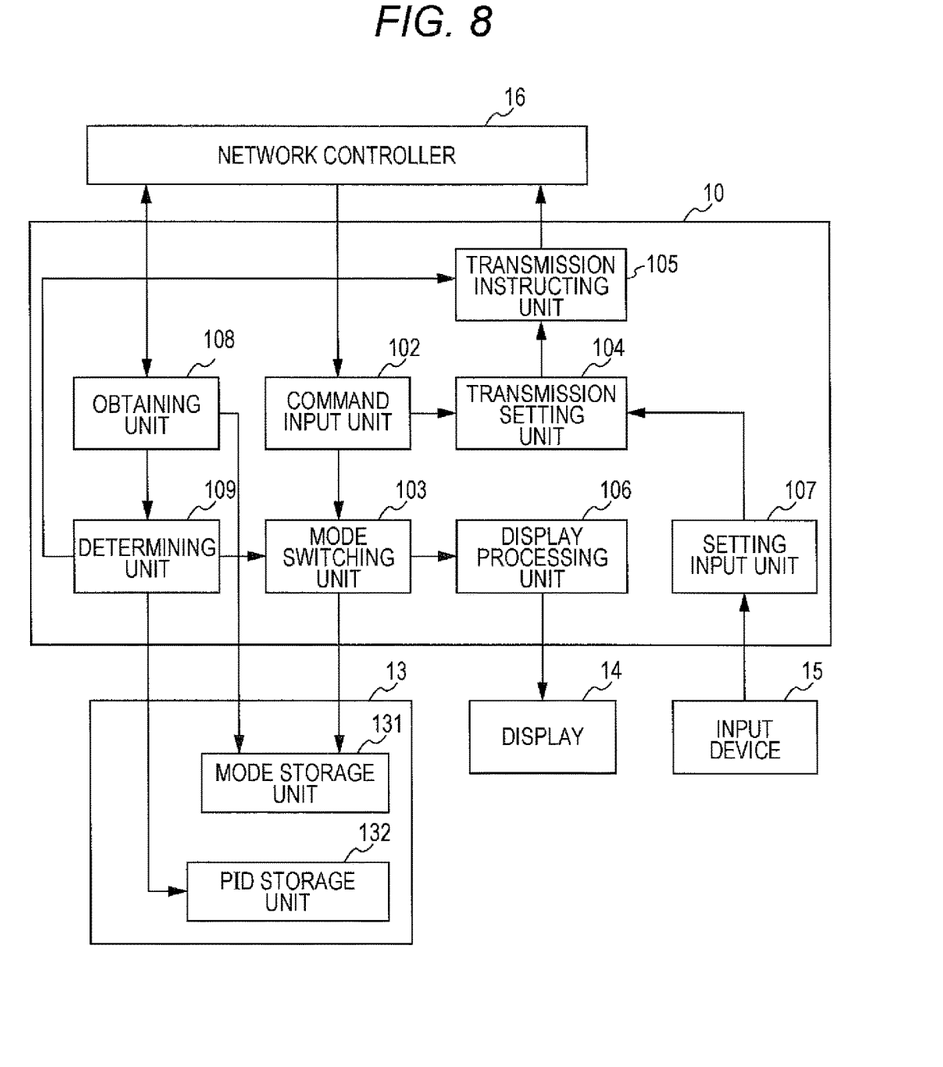
FIG. 8 is a block diagram illustrating an example of a function configuration of the PC.

FIG. 8 is a block diagram illustrating an example of a function configuration of the PC 100 for performing the above-described operation. The CPU 10 of the PC 100 mainly realizes each function in FIG. 8 by reading the program stored in the ROM 11 on the RAM 12 to execute. However, at least a part of functions may also be realized by hardware illustrated in FIG. 2 or another hardware not illustrated such as an electric circuit.

With reference to FIG. 8, the CPU 10 of the PC 100 includes a command input unit 102, a mode switching unit 103, a transmission setting unit 104, a transmission instructing unit 105, a display processing unit 106, a setting input unit 107, an obtaining unit 108, and a determining unit 109.

The command input unit 102 receives the input of the command and transmission setting from the setting application. The mode switching unit 103 switches the operation mode between the UI less mode and the normal mode based on the command from the setting application.

The transmission setting unit 104 sets the transmission setting input from the setting application in the UI less mode as the transmission setting of the specified file. The transmission instructing unit 105 instructs the MFP 300 to transmit the specified file.

The display processing unit 106 performs a process of displaying a transmission setting screen for receiving the transmission setting in the normal mode on the display 14. The setting input unit 107 receives the input by the user operation on the transmission setting screen.

The obtaining unit 108 obtains the PID being the identification information associated with a series of processes in the setting application after the setting application inputs the transmission setting to the fax driver until this inputs the command to switch the UI less mode to the normal mode from the setting application. The determining unit 109 determines whether the operation mode is appropriately the UI less mode by comparing the PID obtained from the setting application when the normal mode is switched to the UI less mode with the PID obtained from the setting application by the obtaining unit 108 before the MFP 300 is instructed to transmit the specified file when the operation mode is the UI less mode.

When the determining unit 109 determines that the operation mode is inappropriately the UI less mode, the mode switching unit 103 switches the operation mode from the UI less mode to the normal mode before the MFP 300 is instructed to transmit the specified file.

Meanwhile, the HDD 13 includes a mode storage unit 131 for storing the current operation mode and a PID storage unit 132 for storing the PID of the setting application. When the CPU 10 starts the fax driver, this reads the operation mode when the fax driver is previously terminated stored in the mode storage unit 131 and starts the fax driver in this mode.

<Operation Flow>

Figure 9:
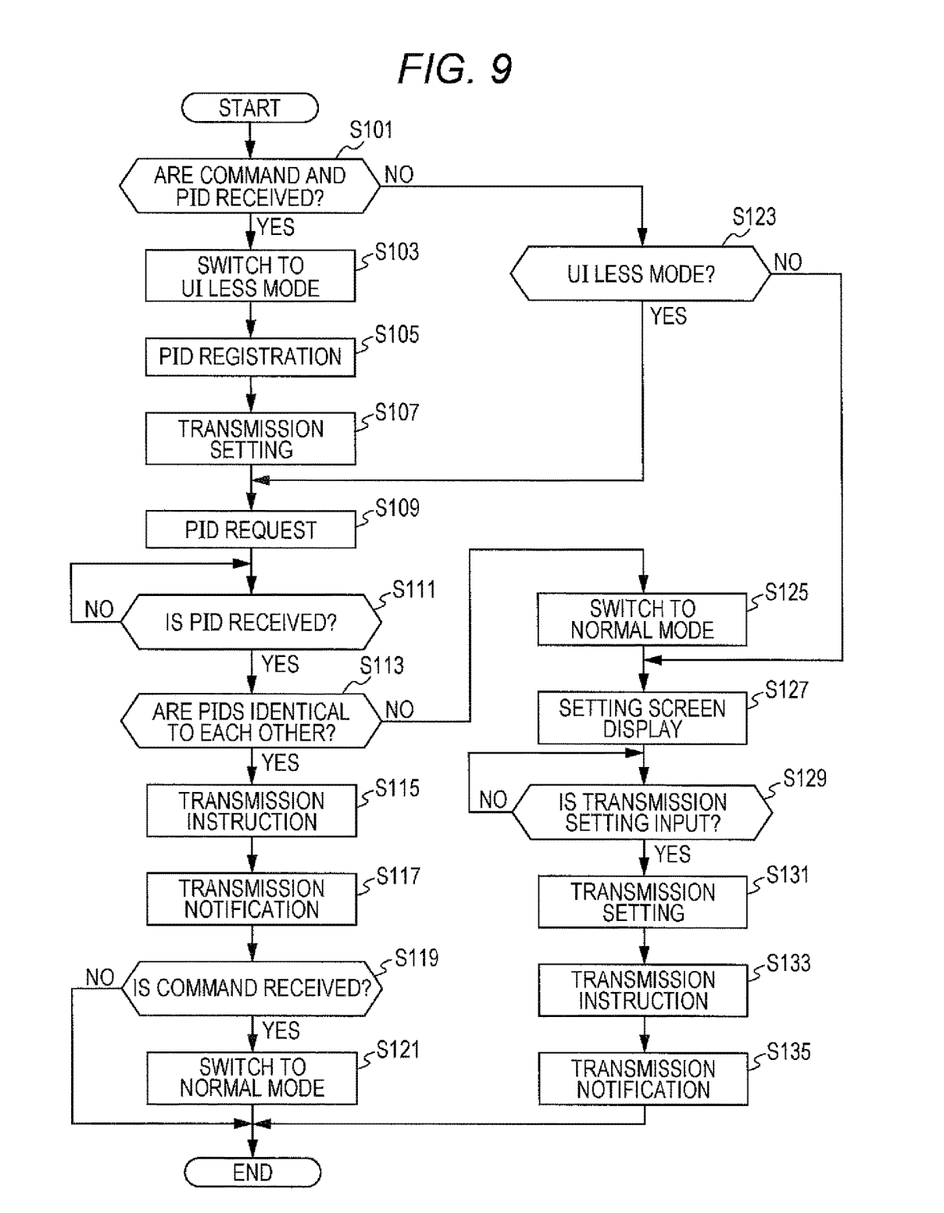
FIG. 9 is a flowchart illustrating an example of a flow of operation of the PC.

FIG. 9 is a flowchart illustrating an example of a flow of the operation of the PC 100. The CPU 10 of the PC 100 realizes the operation illustrated in the flowchart in FIG. 9 by reading the program stored in the ROM 11 on the RAM 12 to execute, thereby fulfilling each function in FIG. 8.

With reference to FIG. 9, when the CPU 10 which executes the fax driver of the PC 100 receives the command to switch the operation mode, PID, and transmission setting from the setting application (Yes at step S101), this switches the operation mode from the normal mode to the UI less mode according to the command (step S103). The CPU 10 registers the PID of the setting application received from the setting application in the HDD 13 (step S105). The CPU 10 which executes the fax driver sets the transmission setting received from the setting application as the transmission setting of the specified file (step S107).

Herein, the CPU 10 which executes the fax driver requests the PID from the setting application before instructing the MFP 300 to transmit the specified file (step S109). When the CPU 10 which executes the fax driver receives the PID from the setting application in response to the request (Yes at step S111), this confirms whether this is identical to the PID registered in the HDD 13 (step S113).

When the PID obtained from the setting application in response to the request is identical to the PID registered in the HDD 13 (Yes at step S113), the CPU 10 which executes the fax driver instructs the MFP 300 to transmit the specified file with the transmission setting at step S107 described above (step S115). The CPU 10 which executes the fax driver notifies the setting application of completion of the transmission instruction (step S117).

Thereafter, when receiving the command to return the operation mode to the normal mode from the setting application (Yes at step S117), the CPU 10 which executes the fax driver returns the operation mode to the normal mode according to the command (step S121) and terminates a series of operation.

On the other hand, when the PID obtained from the setting application in response to the request is not identical to the PID registered in the HDD 13 (No at step S113), the CPU 10 which executes the fax driver switches the operation mode to the normal mode (step S123). The CPU 10 performs the operation in the normal mode. That is to say, the CPU 10 which executes the fax driver displays the setting screen for receiving the input of the transmission setting on the display 14 (step S127) and receives the input of the transmission setting from the user. When receiving the input of the transmission setting from the user (Yes at step S129), the CPU 10 which executes the fax driver sets the input setting as the transmission setting of the specified file (step S131). The CPU 10 which executes the fax driver instructs the MFP 300 to transmit the specified file with the transmission setting at step S131 described above (step S133). The CPU 10 which executes the fax driver notifies the setting application of the completion of the transmission instruction (step S135) to terminate a series of operation.

Meanwhile, in case of the UI less mode in a state in which the command, PID, and transmission setting are not received from the setting application (No at step S101 and Yes at step S123), the CPU 10 which executes the fax driver requests the PID from the setting application before instructing the MFP 300 to transmit the file with the registered transmission setting (step S109). The CPU 10 thereafter determines whether the UI less mode is appropriate by performing the operation after step S111 described above.

On the other hand, in case of the normal mode in a state in which the command, PID, and transmission setting are not received from the setting application (No at step S101 and No at step S123), the CPU 10 which executes the fax driver performs the operation after step S127 described above being the operation defined in the normal mode.

A setting application instructs a fax driver to transmit a file by directly passing transmission setting and a command to the same as described above. As another example, the setting application may start another application such as a document preparation application and instruct the application to transmit. A system configuration in accordance with embodiments of the invention is similar to the system configuration described above, so that the description thereof is not repeated.

Figure 10:
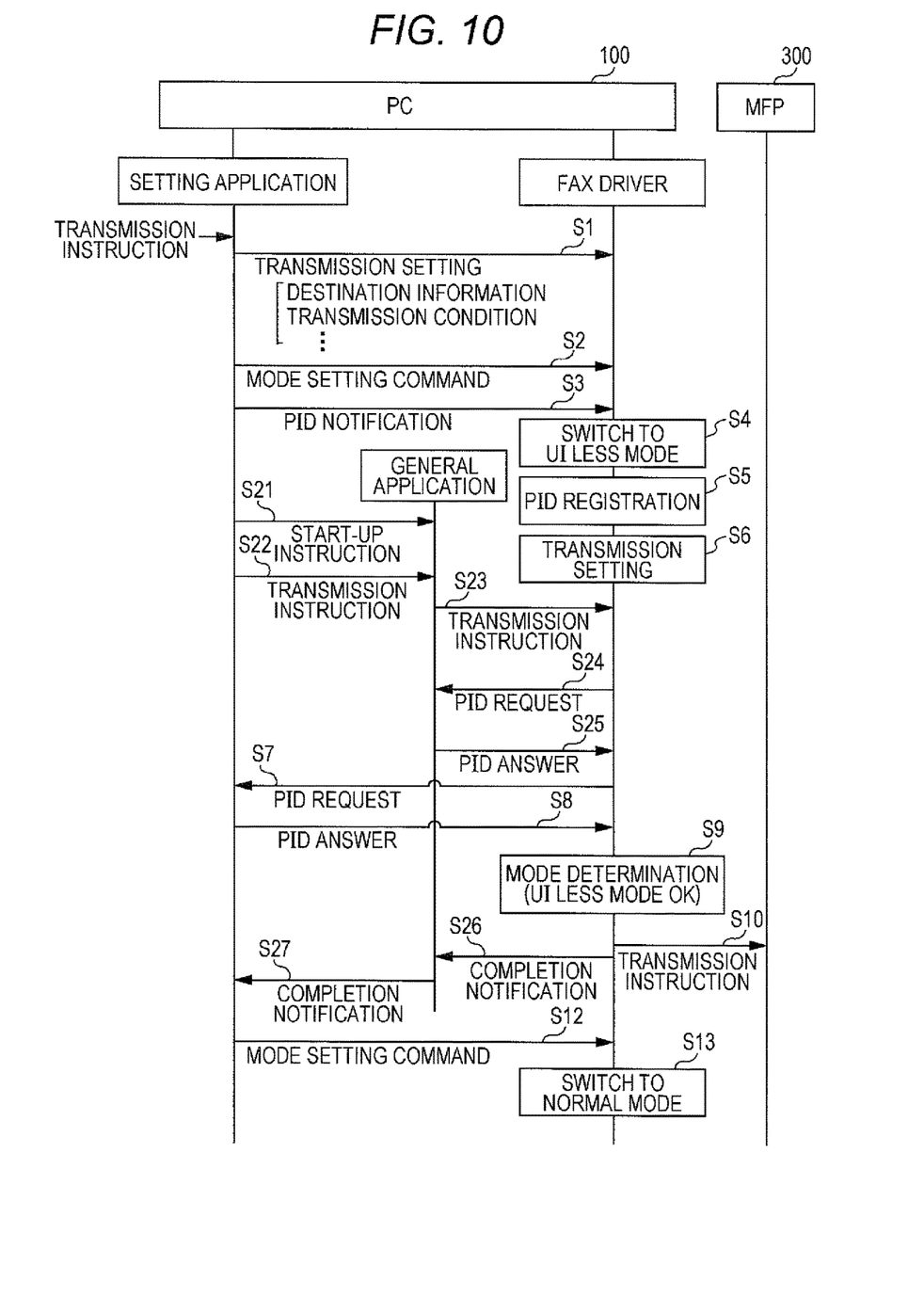
FIG. 10 is a view illustrating an operation outline of a system according to a second embodiment.

FIG. 10 is a view illustrating an operation outline of a system in accordance with embodiments of the invention. In FIG. 10, the same step number is assigned to the same operation as that of the system as described above. With reference to FIG. 10, a CPU 10 which executes the setting application transmits the transmission setting and a mode setting command to the fax driver (steps S1 and S2), notifies the same of a PID associated with a current process (step S3), and thereafter starts an application (general application) associated with a specified file (step S21). For example, when the specified file is a document file, the CPU 10 which executes the setting application starts an application for browsing a document, an application for preparing a document and the like. The CPU 10 which executes the setting application instructs the application to transmit the file (step S22).

The application instructed by the setting application to transmit the file passes the instruction to transmit the specified file to the fax driver (step S23).

The CPU 10 which executes the fax driver requests a current PID from the setting application to obtain the PID of the setting application (steps S7 and S8) before instructing the MFP 300 to transmit the file. Herein, as described above, the CPU 10 may also request the PID from all applications currently executed by the CPU 10, that is to say, the application instructed by the above-described setting application to transmit the file to obtain the PID of the application (steps S24 and S25).

Hereinafter, the CPU 10 which executes the fax driver performs the operation similar to that of the system as described above. Meanwhile, the CPU 10 which executes the fax driver may also notify the setting application of completion of the transmission instruction through the above-described application (steps S26 and S27).

Effect of Embodiments

The PC 100 which serves as an information transmitting device performs the above-described operation in one or more embodiments, so that it is possible to cope with a case in which the CPU 10 terminates the operation of the setting application halfway without passing the command to return the operation mode to the normal mode to the fax driver as illustrated in FIG. 5. That is to say, in this case, when the fax driver is started next time, the UI less mode being the operation mode when this is previously terminated is stored and this is started in this operation mode. Then, the fax driver instructs the MFP 300 to transmit the specified file with the transmission setting such as the destination previously passed from the setting application without displaying the setting screen on the display 14.

However, in one or more embodiments, the PID obtained from the setting application when the PC 100 switches the operation mode to the UI less mode with the PID obtained from the setting application before the instruction to transmit the file is issued. This comparison is to confirm whether the UI less mode is appropriate as the operation mode when transmitting the file. That is to say, when the PIDs are herein identical to each other, the instruction to transmit the file is issued in a series of operation in the UI less mode based on the instruction from the setting application. On the other hand, when the PIDs are not identical to each other, there is possibility that current transmission of the file is not by the instruction from the setting application which performs the operation associated with the stored PID, that is to say, that the mode is not returned to the normal mode after previous switching to the UI less mode by the setting application. In this case, the CPU 10 which executes the fax driver may automatically switch the mode to the normal mode, thereby avoiding the instruction to transmit the file with the transmission setting such as the (previous) destination which is not intended by the user.

Another Example

Furthermore, it is also possible to provide a program which allows the CPU 10 of the PC 100 to execute the above-described transmitting operation. It is possible to allow an existing information processing device to serve as the above-described information transmitting device by providing such program.

Such program may also be recorded in a computer readable recording medium such as a flexible disk, a CD-ROM (compact disk-read only memory), a ROM, a RAM and a memory card attached to the computer to be provided as a program product. Alternatively, it is also possible to provide the program in a manner recorded in a recording medium such as a hard disk incorporated in the computer. It is also possible to provide the program by downloading through a network.

Meanwhile, the program according to this disclosure may call a required module out of program modules provided as a part of an operating system (OS) of the computer in a predetermined array at a predetermined timing for executing the process. In this case, the above-described module is not included in the program itself and the process is executed in cooperation with the OS. Such program which does not include the module may also be included in the program according to this disclosure.

The program according to this disclosure may also be incorporated in another program to be provided. In this case also, the module included in another program described above is not included in the program itself and the process is executed in cooperation with another program. Such program incorporated in another program may also be included in the program according to this disclosure.

A provided program product is installed in a program storage unit such as the hard disk to be executed. Meanwhile, the program product includes the program itself and the recording medium in which the program is recorded.

Although the invention has been described and illustrated in detail, it is clearly understood that the same is by way of illustrated and example only and is not to be taken by way of limitation, the scope of the invention being interpreted by terms of the appended claims. It is intended that all modifications within the meaning and range equivalent to the scope of claims are included therein.

Although the disclosure has been described with respect to only a limited number of embodiments, those skilled in the art, having benefit of this disclosure, will appreciate that various other embodiments may be devised without departing from the scope of the invention. Accordingly, the scope of the invention should be limited only by the attached claims.

What is claimed is:

1. An information transmitting device comprising:
   a receiver that receives setting of a first mode in which data is transmitted based on transmission setting received from an application for setting or a second mode in which the data is transmitted based on the transmission setting received by input from a user on a setting screen as a transmitting mode;
   a transmitter that transmits the data in the transmitting mode the setting of which is received;
   a first obtaining circuit that obtains from the application for setting for each transmitting process of the data by the transmitter identification information that identifies a process;
   a storage that stores the obtained identification information;
   a second obtaining circuit that obtains the identification information regarding the transmitting process of the data to be transmitted before the transmitter transmits the data when the first mode is set;
   a determining circuit that determines whether the identification information stored in the storage is identical to the identification information obtained by the second obtaining circuit; and
   a switching circuit that switches the transmitting mode to the second mode when it is determined that pieces of the identification information are not identical to each other,
   wherein the identification information comprises a process identifier automatically assigned to the process and is associated with the process by the application for setting after the first mode is set until the transmitting mode is switched to the second mode, and
   wherein the process is one of a plurality of processes in a computer that executes the application for setting, each of the plurality of processes being automatically assigned a corresponding process identifier.

2. The information transmitting device according to claim 1, wherein the identification information is updated each time the process by the application for setting is completed.

3. The information transmitting device according to claim 1, wherein the receiver receives setting to switch from the first mode to the second mode when the transmitting process of the data by the transmitter in a state in which the first mode is set is completed.

4. The information transmitting device according to claim 1, wherein the first obtaining circuit obtains the identification information when the setting of the first mode is received by the receiver.

5. An information transmitting method of an information transmitting device provided with a transmitter which transmits data in a set transmitting mode, the information transmitting method comprising:
   a receiving step of receiving setting of a first mode in which the data is transmitted based on transmission setting received from an application for setting or a second mode in which the data is transmitted based on the transmission setting received by input from a user on a setting screen as the transmitting mode;
   a first obtaining step of obtaining from the application for setting for each transmitting process of the data by the transmitter identification information that identifies a process;
   a storing step of storing the obtained identification information in a storage;
   a second obtaining step of obtaining the identification information regarding the transmitting process of the data to be transmitted before the transmitter transmits the data when the first mode is set;

a determining step of determining whether the identification information stored in the storage is identical to the identification information obtained at the second obtaining step; and a switching step of switching the transmitting mode to the second mode when it is determined that pieces of the identification information are not identical to each other, wherein the identification information comprises a process identifier automatically assigned to the process and is associated with the process by the application for setting after the first mode is set until the transmitting mode is switched to the second mode, and wherein the process is one of a plurality of processes in a computer that executes the application for setting, each of the plurality of processes being automatically assigned a corresponding process identifier.

6. The information transmitting method according to claim 5, wherein the identification information is updated each time the process by the application for setting is completed.

7. The information transmitting method according to claim 5, wherein the receiving step receives setting to switch from the first mode to the second mode when the transmitting process of the data by the transmitter in a state in which the first mode is set is completed.

8. The information transmitting method according to claim 5, wherein the first obtaining step obtains the identification information when the setting of the first mode is received at the receiving step.

9. A non-transitory recording medium storing a computer readable information transmitting program an information transmitting process of which is executed by a computer of an information transmitting device provided with a transmitter which transmits data in a set transmitting mode, the information transmitting program allowing the computer to execute:

a receiving step of receiving setting of a first mode in which the data is transmitted based on transmission setting received from an application for setting or a second mode in which the data is transmitted based on the transmission setting received by input from a user on a setting screen as the transmitting mode;

a first obtaining step of obtaining from the application for setting for each transmitting process of the data by the transmitter identification information that identifies a process;

a storing step of storing the obtained identification information in a storage;

a second obtaining step of obtaining the identification information regarding the transmitting process of the data to be transmitted before the transmitter transmits the data when the first mode is set;

a determining step of determining whether the identification information stored in the storage is identical to the identification information obtained at the second obtaining step; and a switching step of switching the transmitting mode to the second mode when it is determined that pieces of the identification information are not identical to each other, wherein the identification information comprises a process identifier automatically assigned to the process and is associated with the process by the application for setting after the first mode is set until the transmitting mode is switched to the second mode, and wherein the process is one of a plurality of processes in a computer that executes the application for setting, each of the plurality of processes being automatically assigned a corresponding process identifier.

10. The non-transitory recording medium storing a computer readable information transmitting program according to claim 9, wherein the identification information is updated each time the process by the application for setting is completed.

11. The non-transitory recording medium storing a computer readable information transmitting program according to claim 9, wherein the receiving step receives setting to switch from the first mode to the second mode when the transmitting process of the data by the transmitter in a state in which the first mode is set is completed.

12. The non-transitory recording medium storing a computer readable information transmitting program according to claim 9, wherein the first obtaining step obtains the identification information when the setting of the first mode is received at the receiving step.

* * * * *